United States Patent
Andrios et al.

(10) Patent No.: US 11,085,358 B2
(45) Date of Patent: Aug. 10, 2021

(54) COOLING AND DEBRIS MITIGATION SYSTEMS FOR WORK VEHICLE POWERTRAINS

(71) Applicant: Deere & Company, Moline, IL (US)

(72) Inventors: John C. Andrios, Silvis, IL (US); Gary H. Knapp, Coal Valley, IL (US); Jeffery C. Mussack, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 261 days.

(21) Appl. No.: 16/430,837

(22) Filed: Jun. 4, 2019

(65) Prior Publication Data
US 2020/0386146 A1    Dec. 10, 2020

(51) Int. Cl.
*F01P 11/12* (2006.01)
*F01P 1/06* (2006.01)
(Continued)

(52) U.S. Cl.
CPC ............... *F01P 11/12* (2013.01); *B04C 5/04* (2013.01); *B04C 5/081* (2013.01); *B60K 11/06* (2013.01); *F01P 1/06* (2013.01); *B60Y 2200/222* (2013.01)

(58) Field of Classification Search
CPC . B60K 11/06; F01P 11/06; F01P 11/12; F01P 1/06
See application file for complete search history.

(56) References Cited

U.S. PATENT DOCUMENTS

| | | | |
|---|---|---|---|
| 6,168,503 B1* | 1/2001 | Pao | B24C 5/04 451/40 |
| 2014/0117701 A1* | 5/2014 | Davis | B60R 1/0602 296/96.15 |

(Continued)

FOREIGN PATENT DOCUMENTS

| | | |
|---|---|---|
| CN | 106985940 A | 7/2017 |
| EP | 0443210 A1 | 8/1991 |

(Continued)

OTHER PUBLICATIONS

Vortec, Vortex Tubes Brochure, www.vortec.com, undated, admitted prior art.
(Continued)

*Primary Examiner* — Long T Tran
(74) *Attorney, Agent, or Firm* — Klintworth & Rozenblat IP LLP

(57) ABSTRACT

Cooling and debris mitigation systems for use with work vehicle powertrains include a pressurized air source, a plurality of impingement outlets positioned proximate the work vehicle powertrain, and a flow network fluidly coupling the pressurized air source to the impingement outlets. A first vortex tube is positioned in the flow network and configured to separate pressurized airflow received from the pressurized air source into a hot stream and a reduced temperature stream. The first vortex tube includes a vortex tube inlet fluidly coupled to the pressurized air source, an exhaust port through which the hot stream is discharged, and a nozzle through which the reduced temperature stream is discharged. The reduced temperature stream impinges upon at least one of the targeted exterior regions of the work vehicle powertrain to provide cooling thereto and reduce debris accumulation thereon.

20 Claims, 8 Drawing Sheets

(51) Int. Cl.
*B60K 11/06* (2006.01)
*B04C 5/04* (2006.01)
*B04C 5/081* (2006.01)

(56) References Cited

U.S. PATENT DOCUMENTS

| | | |
|---|---|---|
| 2016/0222616 A1* | 8/2016 | Storm ................... E01H 8/105 |
| 2017/0211441 A1* | 7/2017 | Johansen ........... B01D 53/9418 |
| 2017/0259788 A1* | 9/2017 | Villa-Real ................. B08B 3/02 |
| 2018/0066609 A1* | 3/2018 | Miller ............... F02M 25/0227 |
| 2019/0031155 A1* | 1/2019 | Mizuno .................. F04B 35/01 |
| 2019/0063011 A1* | 2/2019 | Planavsky ........... E01C 23/0933 |
| 2019/0322294 A1* | 10/2019 | Worden ................ B61C 15/107 |

FOREIGN PATENT DOCUMENTS

| | | |
|---|---|---|
| EP | 0887524 A2 | 6/1998 |
| KR | 101513587 B1 | 4/2015 |

OTHER PUBLICATIONS

Pelmar Engineering Ltd., Vortex Tubes Brochure, www.pelmareng.com, undated, admitted prior art.

\* cited by examiner

COOLING AND DEBRIS MITIGATION SYSTEMS FOR WORK VEHICLE POWERTRAINS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to cooling debris and mitigation systems for usage within work vehicle powertrains, such as the powertrains of combine harvesters and other work vehicles operated in debris-laden environments.

BACKGROUND OF THE DISCLOSURE

Certain work vehicles routinely operate in environments containing relatively large quantities of airborne debris. For example, in the case of combine harvesters and other crop harvesting equipment, relatively large quantities of dust, small pieces of crop matter, and other debris (generally referred to herein as "Foreign Object Debris" or "FOD") may become airborne and, ultimately, may be ingested into the engine compartment of the work vehicle. Once ingested, the airborne FOD may circulate within the engine compartment and settle on regions of the engine and/or other powertrain components located within the engine compartment. In instances in which such airborne FOD is combustible, as in the case of organic matter commonly ingested by combine harvesters and other crop harvesting equipment, a risk arises that the FOD may ignite and develop into an engine fire (herein, an "FOD-induced fire"). Certain systems have been proposed for decreasing the risk of FOD-induced fire risks in combine harvesters and similar work vehicles; however, such systems are typically hampered by excessive complexities, high part counts, and prohibitive integration costs. Often, such proposed systems require the usage of Freon or another circulated coolant to achieve the desired cooling effect. Further, such proposed systems may be ineffective at significantly lowering the risk of FOD-induced fires within work vehicle powertrains when considered under real-world operating conditions.

SUMMARY OF THE DISCLOSURE

Cooling and debris mitigation systems are provided for usage in conjunction with the powertrains of work vehicles, such as combine harvesters and other work vehicles operated in debris-laden ambient environments. In embodiments, the cooling and debris mitigation system includes a pressurized air source providing pressurized airflow at a first temperature, a plurality of impingement outlets positioned proximate the work vehicle powertrain to direct airstreams against targeted exterior regions thereof, and a flow network fluidly coupling the pressurized air source to the plurality of impingement outlets. A first vortex tube is positioned in the flow network and configured to separate pressurized airflow received from the pressurized air source into a hot stream and a reduced temperature stream. The first vortex tube includes a vortex tube inlet fluidly coupled to the pressurized air source, an exhaust port through which the hot stream is discharged, and a nozzle through which the reduced temperature stream is discharged at a second temperature less than the first temperature. The reduced temperature stream impinges upon at least one of the targeted exterior regions of the work vehicle powertrain to provide cooling thereto and to reduce debris accumulation thereon. The reduced temperature stream may impinge upon the targeted region or regions of the work vehicle powertrain immediately after exhaustion through the vortex tube nozzle; or, instead, may travel through additional plumbing features (e.g., conduits) before impinging upon the targeted region(s) of the work vehicle powertrain.

In other embodiments, the cooling and debris mitigation system contains a pressurized air source, a flow network, and at least one vortex tube. The vortex tube is configured to separate pressurized airflow received from the pressurized air source into a hot stream and a reduced temperature stream. The vortex tube includes a vortex tube inlet fluidly coupled to the pressurized air source, an exhaust port through which the hot stream is discharged, and a nozzle through which the reduced temperature stream is discharged. The flow network includes a supply flow line, which fluidly couples an outlet of the pressurized air source to the vortex tube inlet; a plurality of impingement outlets positioned about the work vehicle powertrain to direct airstreams against targeted exterior regions thereof; and a manifold flow line fluidly coupling the nozzle of the vortex tube to the plurality of impingement outlets.

In still further embodiments, the cooling and debris mitigation system contains a pressurized air source providing pressurized airflow, a flow network fluidly coupling an outlet of the pressurized air source, and an array of vortex tubes positioned in the flow network and spaced alongside the work vehicle powertrain. The array of vortex tubes includes vortex tube inlets fluidly coupled to the pressurized air source by the flow network. The internal flow geometries of the vortex tubes, as included in the vortex tube array, are configured to separate pressurized airflow received at the vortex tube inlets into hot streams and reduced temperature streams. The vortex tubes further include exhaust ports through which the hot streams are discharged, as well nozzles through which the reduced temperature streams are discharged for impingement against targeted exterior regions of the work vehicle powertrain.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
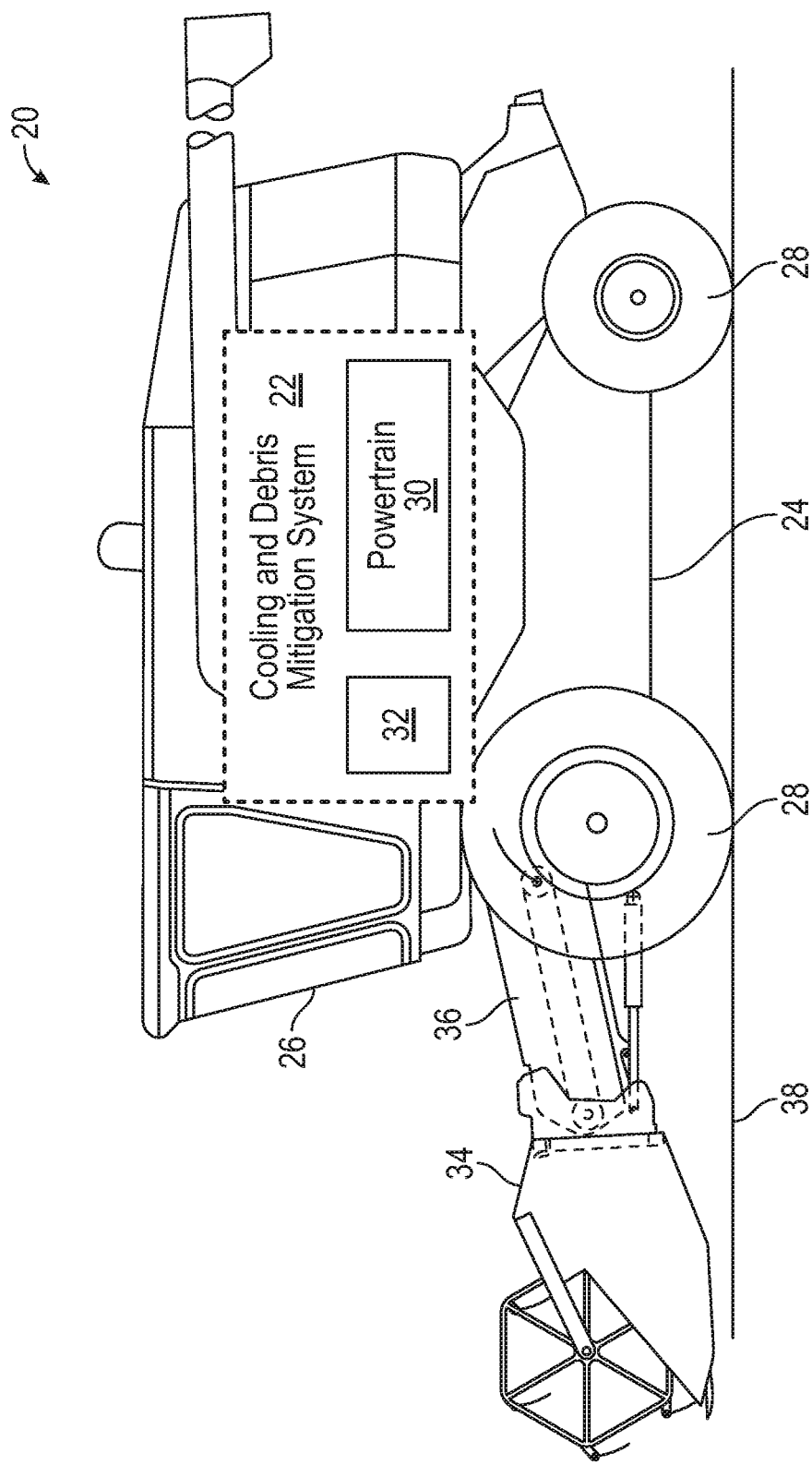
FIG. 1 is a side schematic of a work vehicle (here, a combine harvester) equipped with a cooling and debris mitigation system, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

The following describes cooling and debris mitigation systems for usage within work vehicles susceptible to FOD-induced fires, such as crop harvesting vehicles and other work vehicles operated in debris-laden ambient environments. As indicated by the term "cooling and debris mitigation," embodiments of the below-described system provide both cooling and debris clearance functionalities by directing cooled airstreams against targeted exterior regions of components contained in a work vehicle powertrain, such as an engine and/or turbocharger, which may otherwise be prone to debris collection and subject to local elevated thermal extremes. The cooled airstreams directed against the powertrain (also referred to as "impingement streams") may be provided as continuous jets, as intermittent air blasts, or as pulsed streams, depending upon system design and/or the mode in which the system is presently operating when operable in multiple modes. Through the provision of both targeted debris clearance and active impingement cooling, the cooling and debris mitigation system can significantly lower FOD-induced fire risk within work vehicle powertrains in many instances.

Embodiments of the cooling and debris mitigation system provide reliable operation over extended periods of time and are amenable to low cost powertrain integration. Such benefits are achieved, at least in part, through the incorporation of specialized vortex tubes (also referred to as "vortex coolers"), which function to passively separate pressurized airstreams into reduced temperature streams and heated exhaust streams. The vortex tubes may contain few, if any actively moving components or parts; and, consequently, are well-suited to provide prolonged, failure-free operation when deployed within relatively harsh, high vibratory, debris-laden ambient environments in which work vehicles often operate. Additionally, the usage of such vortex tubes, when paired with a pressurized air source capable of supplying pressurized (preferably filtered) airflow at sufficiently elevated pressure levels, enables temperature reduction of the impingement streams without reliance on more complex cooling means (e.g., coolant flow sharing with the work vehicle powertrain) and with an acceptable tradeoff in pressure reduction. Embodiments of the cooling and debris mitigation system may thus convert excess pressurized airflow into reduced temperature airstreams via the vortex tubes, which may be adapted to provide an optimal balance between pressure levels suitable for debris clearance purpose and airstream temperature reduction for impingement cooling of targeted powertrain hot spots.

Notably, combine harvesters and other work vehicles are commonly equipped with air compressors to, for example, provide operators with a convenient means to clean the work vehicle utilizing an air-powered cleaning accessory (e.g., a handheld wand) when the work vehicle is not use. In instances in which the work vehicle is equipped with such an air compressor, the cooling and debris mitigation system may leverage the existing air compressor (possibly along with other existing components, such as an air pressure tank) for usage as a pressurized air source form which the vortex tube(s) may draw pressurized airflow. This may reduce integration costs through the usage or sharing of existing components onboard a work vehicle. Further, energy savings may be achieved by utilizing excess pressurized airflow generated by the compressor (which may be actively driven during work vehicle operation) in providing the below-described cooling and debris clearance functionalities.

Integration of the cooling and debris mitigation system may further be facilitated by the external nature of the conduits and impingement outlets, which are routed around an outer periphery of the work vehicle powertrain or otherwise strategically positioned to deliver the impingement streams against the targeted powertrain region(s). Consequently, the cooling debris and mitigation system may be amenable to integration into work vehicle powertrains with relatively minor, if any modifications to existing powertrain components and infrastructure; and, in certain instances, may be integrated into a given work vehicle powertrain by retrofit installation following original manufacture. Embodiments of the cooling and debris mitigation system also feature highly flexible designs, which are adaptable across multiple work vehicle platforms and which may be expandable to include any desired number of impingement outlets tailored to the particular powertrain into which the system is integrated.

Additional description of an example cooling and debris mitigation system deployed onboard a work vehicle will now be discussed in connection with FIGS. 1-8. While the example cooling and debris mitigation system is described below in the context of a particular type of work vehicle (namely, an agricultural combine or combine harvester), embodiments of the cooling and debris mitigation system can be utilized onboard numerous different types of work vehicles. In this regard, embodiments of the cooling and debris mitigation system may be beneficially integrated into any work vehicle containing a powertrain susceptible to FOD-induced fires, particularly those work vehicles routinely operated in ambient environments containing relatively large amounts of airborne combustible debris. A non-exhaustive list of work vehicles into which embodiments of the cooling and debris mitigation system may be usefully integrated includes other types of harvesting equipment, such as tractors and cotton harvesters; forestry work vehicles, such as feller bunchers; and construction work vehicles including loaders, dozers, excavators, and motor graders.

Combine Harvester Equipped with an Example Cooling and Debris Mitigation System

FIG. 1 schematically depicts a combine harvester 20 including a cooling and debris mitigation system 22, as illustrated in accordance with an example embodiment of the present disclosure. The combine harvester 20 includes a wheeled body or chassis 24 and an operator station 26. The wheels 28 of the work vehicle chassis 24 are driven through a powertrain, as generically depicted in FIG. 1 by box 30 (hereafter, the "powertrain 30"). As indicated in FIG. 1, the powertrain 30, or portions of powertrain 30, may be considered part of the cooling and debris mitigation system 22 in at least some embodiments of the present disclosure. Comparatively, box 32 represents an externally-accessible air compressor (hereafter, the "air compressor 32"), which may be further included in the cooling and debris mitigation system 22 in embodiments. The illustrated combine harvester 20 further includes various other components, such as a standard header or grain platform 34 mounted to a feederhouse 36 projecting from the front end of the combine harvester 20. Such additional components are known within the industry and not described in detail herein. It may be noted, however, that various other types of modular headers may be interchanged with the illustrated grain platform 34 and attached to the feederhouse 36, as appropriate, for harvesting different varieties of crops utilizing the harvester 20.

As the combine harvester 20 travels over a field 38, crop plants are severed by the grain platform 34, taken into the feederhouse 36, and processed in subsequent sections of the harvester 20. Such activities often result in the generation of relatively large amounts of combustible debris, such as plant, soil matter, and particulate dust, which is released into the air as FOD. The airborne FOD is then ingested into the engine compartment of the combine harvester 20. After ingestion, such airborne FOD tends to swirl or otherwise circulate about the engine compartment of the harvester 20 in an erratic or turbulent manner. The circulating FOD may settle upon and accumulate on certain regions of the powertrain 30 housed within the engine compartment of the harvester 20, such as those regions of the powertrain 30 having exposed mating interfaces between components and/or more complex external geometries. Depending upon the propensity of such airborne FOD to combust (e.g., the flash point of the FOD), an appreciable risk of fire may arise should a sufficient quantity of the airborne FOD accumulate on regions of the powertrain 30 in which highly elevated local temperatures or "hot spots" occur. Certain secondary factors may also contribute to the likelihood of such FOD-induced engine fires including, for example, current ambient temperatures and atmospheric moisture levels. Therefore, to reduce the likelihood of FOD-induced engine fires, the combine harvester 20 is further equipped with the cooling and debris mitigation system 22, an example of which will now be described in detail in connection with FIG. 2.

Figure 2:
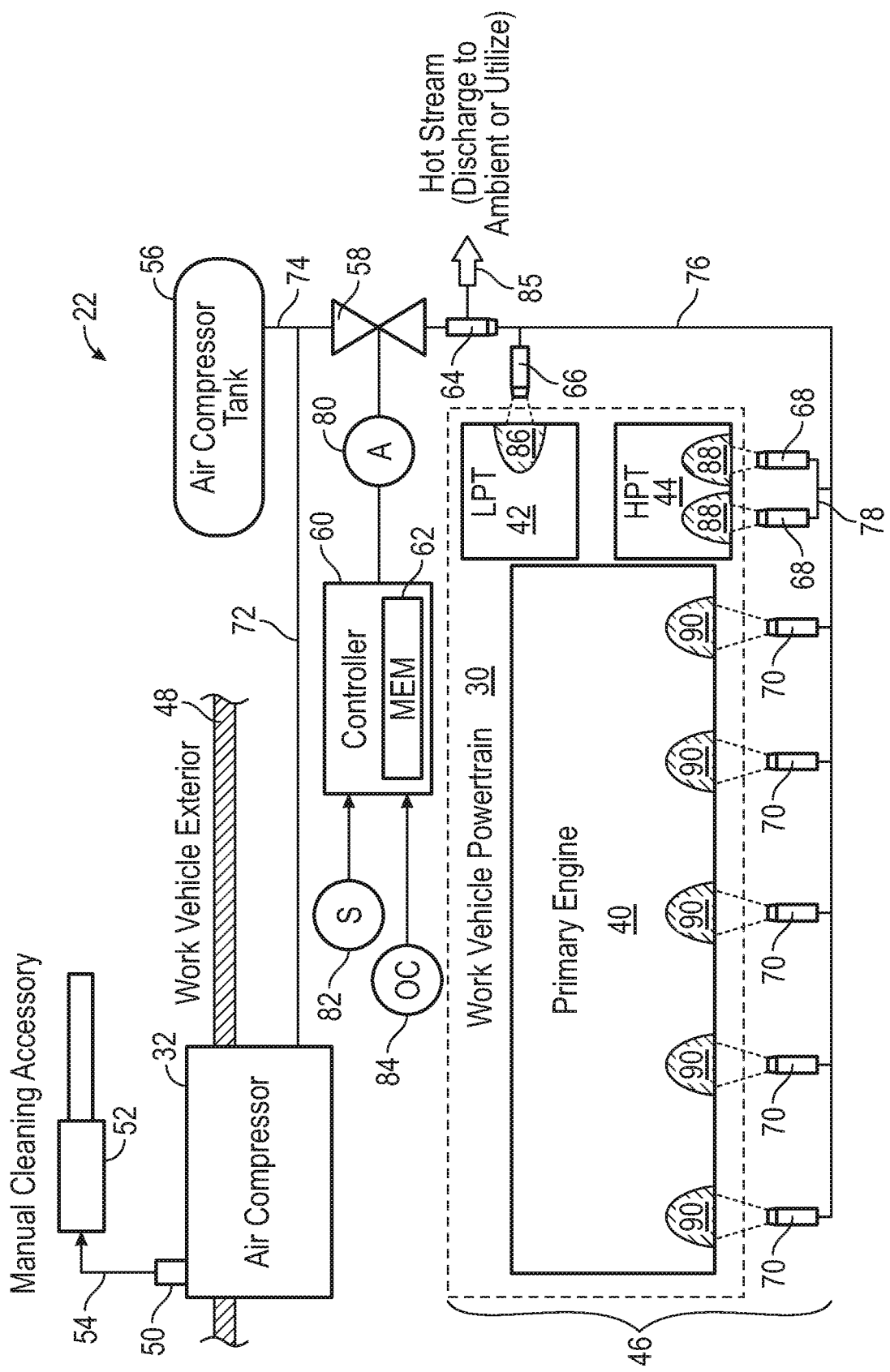
FIG. 2 is a schematic of an example cooling and debris mitigation system, a work vehicle powertrain, and certain other components, which may be integrated into the combine harvester shown in FIG. 1.

Referring to FIG. 2, an example of various components suitably included within the example cooling and debris mitigation system 22 is schematically illustrated. In the illustrated embodiment, the work vehicle powertrain 30 includes a primary internal combustion engine 40, a low pressure turbine (LPT) section 42, and a high pressure turbine (HPT) section 44. The LPT section 42 and the HPT section 44 are positioned in flow series and fluidly coupled to the engine 40 to provide a turbocharging function thereto. As generically indicated in FIG. 2, the LPT section 42 and the HPT section 44 (collectively, a turbocharger 42, 44) may be situated adjacent or otherwise positioned in relatively close proximity of the engine 40. The primary engine 40 and the turbocharger 42, 44 may each be housed within an engine compartment 46 of the combine harvester 20, as may various other components of the system 22 and the powertrain 30.

As indicative above, the cooling and debris mitigation system 22 may include an air compressor 32 in certain embodiments. When present, the air compressor 32 (or at least a port of the air compressor 32) may be mounted on or through an external wall 48 of the combine harvester 20 (or other work vehicle) to allow the manual connection of air-powered tools when the harvester 20 is not piloted or is otherwise not in use. For example, as indicated in FIG. 2, the air compressor 32 may include at least one externally-accessible outlet 50 to which a manual cleaning accessory 52 may be fluidly connected utilizing, for example, a quick coupling. The fluid connection joining the manual cleaning accessory 52 (e.g., a handheld cleaning wand) to the external outlet 50 of the air compressor 32 (also referred herein to as a "manual accessory coupling") is represented by flow line 54. Such a manual cleaning accessory 52 may thus be selectively coupled to the air compressor 32 (or to the below-described air compressor tank 56); and, when so coupled, may receive pressurized airflow therefrom. An operator of the combine harvester 20 may then utilize the pressurized air discharged from the manual cleaning accessory 52 to clear debris and other matter from the combine harvester 20 when not in usage.

In addition to the air compressor 32, the example cooling and debris mitigation system 22 further includes an air compressor tank 56; at least one control valve 58; a controller 60 associated with a computer-readable memory 62; a plurality of vortex tubes 64, 66, 68, 70; and a flow network 72, 74, 76, 78. The flow network 72, 74, 76, 78 fluidly interconnects the various fluid-conducting components of the cooling and debris mitigation system 22, as schematically shown. Specifically, the flow lines 72, 74 included in the flow network 72, 74, 76, 78 fluidly couple an outlet of the air compressor 32 to a port of the air compressor tank 56, while the flow line 74 further fluidly couples the port of the air compressor tank 56 to an inlet side of the control valve 58. The flow line 74 may also be referred to a "supply line" herein as the flow line 74 fluidly couples the pressurized air source 32, 56 to the inlet of the vortex tube 64 and to the other vortex tubes 66, 68, 70 downstream thereof. Lastly, the flow lines 76, 78 further contained in the flow network 72, 74, 76, 78 fluidly couple the outlet side of the control valve 58 to the plurality of vortex tubes 64, 66, 68, 70 positioned in the flow network 72, 74, 76, 78. The flow lines making-up the flow network 72, 74, 76, 78 can be realized utilizing flexible tubing, rigid piping, other conduit types, and combinations thereof. Numerous other configurations or flow architectures are also possible in further implementations of the system 22.

Collectively, the air compressor 32 and the air compressor tank 56 serve as a pressurized air source 32, 56, which supplies pressurized airflow to the vortex tubes 64, 66, 68, 70 during operation of the system 22. Usage of the externally-accessible air compressor 32, when present on the combine harvester 20 (or other work vehicle), as a pressurized air source can provide component cost reduction and energy savings. Conventionally, the excess compressed airflow generated by the compressor 32 is discharged to ambient or "dumped overboard" when the combine harvester 20 is engaged in crop harvesting or otherwise actively piloted. Energy savings may consequently be achieved through usage of such excess compressed airflow when providing the below-described impingement cooling and debris clearance functionalities. Additionally, the usage of the externally-accessible air compressor 32 and/or the air compressor tank 56, when pre-existing components onboard the harvester 20, may also reduce integration costs of the system 22. These benefits notwithstanding, the example cooling and debris mitigation system 22 may omit the air compressor 32 and/or the air compressor tank 56 (or may utilize a different type of air compressor) in further embodiments, providing that a suitable supply of pressurized airflow is available to the vortex tubes 64, 66, 68, 70.

The flow of pressurized air from the pressurized air source 32, 56 to the vortex tubes 64, 66, 68, 70 may be controlled through modulation of the control valve 58. To modulate the control valve 58, the controller 60 selectively transmits control commands to a valve actuator 80 mechanically linked to the valve element of the control valve 58. Such commands can be electrical, pneumatic, or hydraulic in nature, depending upon the design of valve actuator 80; e.g., in embodiments, the valve actuator 80 may assume the form of an electromechanical valve actuator, which receives electrical command signals from the controller 60. The valve actuator 80 may move a valve element contained in the control valve 58 between open, closed, and perhaps intermediate (partially open) positions in accordance with the commands received from the controller 60. The controller 60 may command the valve actuator 80 to modulate the control valve 58, and thereby regulate the flow of pressurized air to the vortex tubes 64, 66, 68, 70, based on any number of factors. Such factors may include, but are not limited to any combination of: (i) data received from one or more sensors onboard the combine harvester 20 (represented by symbol 82 in FIG. 2), (ii) operator commands received from an operator input device located in the operator station 26 of the harvester 20 (represented by symbol 84 in FIG. 2), and/or (iii) stored data (e.g., a schedule or mode scheme) retained in the memory 62.

The controller 60 can assume any form suitable for performing the functions described herein, with the term "controller" utilized in a non-limiting sense to generally refer to the processing architecture of the cooling and debris mitigation system 22. Accordingly, the controller 60 can encompass or may be associated with one or more processors, computer-readable memories (including or in addition to the memory 62), power supplies, storage devices, interface cards, and other standardized components. The controller 60 may also include or cooperate with any number of firmware and software programs or computer-readable instructions designed to carry-out the various process tasks, calculations, and control functions described herein. Similarly, the memory 62 can encompass any number and type of storage media or areas suitable for storing computer-readable code or instructions for the controller 60, as well as other data utilized to support the operation of the cooling and debris mitigation system 22.

In less complex embodiments, the cooling and debris mitigation system 22 may lack more advanced intelligence or logic, in which case the controller 60 and its associated components may be omitted from the system 22. For example, in certain cases, pressurized airflow may be delivered to the vortex tubes 64, 66, 68, 70 at any juncture during which the air compressor 32 actively discharges compressed airflow, while the air compressor tank 56 is filled. Similarly, in embodiments, the control valve 58 may be replaced by a vent valve or a pressure relief valve (also generically represented by valve symbol 58 in FIG. 2), which opens to permit airflow to the vortex tubes 64, 66, 68, 70 when a pressure differential across the pressure relief valve surpasses a first predetermined pressure threshold. This predetermined pressure threshold may correspond to, for example, a maximum fill pressure of the air compressor tank 56. The air compressor 32 may thus initially fill the air compressor tank 56; and, after the air compressor tank 56 has reached capacity, the pressure relief valve may open to divert additional pressurized airflow from the tank 56 into the below-described vortex tubes 64, 66, 68, 70. Additionally, in such embodiments, the pressure relief valve can be configured to close at a second pressure differential less than the first pressure differential such that air compressor tank 56 partially empties prior to closing of the pressure relief valve. This, in effect, creates a passively-generated pulse effect, which may improve the effectiveness of the cooling and debris mitigation system 22 in clearing debris that may otherwise accumulate on the powertrain 30 in at least some instances.

In further embodiments, the controller 60 may actively modulate the control valve 58 to regulate the flow of pressurized air to the vortex tubes 64, 66, 68, 70 during operation of the cooling and debris mitigation system 22. For example, in one approach, the controller 60 may simply command the control valve 58 to move into an open position when the system 22 is active; e.g., when the combine harvester 20 is operational (and perhaps continuing for a predetermined time following harvester shutdown) or when operator commands are received (via the input device 84) requesting activation of the system 22. In other instances, the controller 60 may command the control valve 58 to open in response to another trigger event or combination of trigger events, such as a monitored temperature within the powertrain 30 and/or the ambient temperature (as measured by the sensor(s) 82) exceeding one or more predetermined thresholds stored in the memory 62. After determining that pressurized airflow is appropriately supplied to the vortex tubes 64, 66, 68, 70, the controller 60 may command the control valve 58 (through commands transmitted to the valve actuator 80) to provide continuous airflow through the control valve 58. Alternatively, the controller 60 may instead command modulation of the control valve 58 to create a desired airflow variance effect, such as a periodic pressure ramping effect, a pulsating effect, or other non-steady state effect. In this latter regard, the controller 60 may control the control valve 58 to repeatedly move the valve element within the valve 58 between (e.g., open and closed or partially closed) positions in a manner generating pressurized air pulses or blasts, which are then supplied to the vortex tubes 64, 66, 68, 70 for enhanced debris clearance.

In certain instances, the controller 60 may be operable in multiple modes and may modulate the control valve 58 differently depending upon the particular mode in which the controller 60 is presently placed. As a specific, albeit non-limiting example, the controller 60 may be operable in at least a debris clearance mode and an enhanced cooling mode in certain implementations. When operating in the debris clearance mode, the controller 60 may command the control valve 58 to generate pressurized air pulses with a greater frequency than when operating in the enhanced cooling mode. Conversely, when operating in the enhanced cooling mode, the controller 60 may control the control valve 58 to provide fewer air pulses over a given time period; or, instead, may provide continuous, non-pulsed airflow to the vortex tubes 64, 66, 68, 70. In such instances, the controller 60 may determine the appropriate mode in which to presently operate based upon the operator commands 84 and/or the sensor input 82. For example, the controller 60 may transition from operation in the debris clearance mode to operation in the enhanced cooling mode when a monitored temperature within the work vehicle powertrain 30 (as detected by the sensors 82) surpasses a predetermined threshold stored in the memory 62, or the controller 60 may transition from operation in the enhanced cooling mode to operation in the debris clearance mode when determining (based on the operator commands 84 or the sensor input 82) that the combine harvester 20 is presently engaged in crop harvesting. Various other control schemes are also possible, including control schemes in which the controller 60 modulates one or more control valves (e.g., a three- or four-way valve) to independently vary the flow of impingement streams directed against multiple different regions of the powertrain 30.

Any number and type of vortex tubes (e.g., including combination of the vortex tubes 64, 66, 68, 70) may be included in embodiments of the cooling and debris mitigation system 22. As appearing herein, the term "vortex tube" refers to a fluid-conducting device that functions to separate a pressurized airstream input into a hot stream and a reduced temperature stream, with the airstream separation achieved at least partially through vortex or cyclonic flow action induced within the flow body of the vortex tube. Correspondingly, the term "reduced temperature stream" refers to an airstream discharged from a vortex tube having a temperature less than that of a hot exhaust stream (also discharged from the vortex tube) and less than the pressurized airstream supplied to the vortex tube. An example of one manner in which a vortex tube may provide such stream separation function is further discussed below in conjunction with FIG. 3.

As just indicated, each vortex tube 64, 66, 68, 70 functions to separate a pressurized input airstream into a hot exhaust stream and a reduced temperature stream. The reduced temperature streams discharged from the vortex tubes 64, 66, 68, 70 are ultimately directed to strike against targeted exterior regions of the work vehicle powertrain 30 as impingement streams. The reduced temperature streams may impinge upon the targeted regions of the powertrain 30 immediately after discharge from the nozzle(s) of the vortex tubes 64, 66, 68, 70; or, instead, may travel through additional conduits or flow lines prior to impinging upon the targeted powertrain regions. Comparatively, the hot streams generated by the vortex tubes 64, 66, 68, 70 will typically be exhausted or vented to the environment, whether by discharge into the engine compartment 46 or directly to the ambient atmosphere. However, the possibility that the hot streams generated by one or more of the vortex tubes 64, 66, 68, 70 may be utilized in some manner (e.g., for energy harvesting or cooling other, exceptionally hot components of the harvester 20) is not precluded. In the schematic of FIG. 2, discharge to ambient (or possible usage) of the hot stream is indicated solely for the vortex tube 64 by the arrow 85. Similarly, although not shown in FIG. 2, the hot streams generated by the other vortex tubes 66, 68, 70 may likewise be discharged to ambient or utilized in some manner during operation of the system 22.

With continued reference to FIG. 2, the cooling and debris mitigation system 22 may further be described as including a plurality of impingement outlets. As appearing herein, the term "impingement outlet" refers to an opening or orifice through which a reduced temperature stream is discharged as an impingement stream, which impinges against a targeted region of a work vehicle powertrain. The nozzles (or other outlets) of the vortex tubes 66, 68, 70 through which the reduced temperature streams are discharged may thus be considered "impingement outlets" in embodiments in which the reduced temperature streams impinge against the targeted powertrain regions immediately after exhaustion through the vortex tube nozzles. Similarly, the outlets or nozzles of additional flow conduits downstream of the vortex tubes may be considered "impingement outlets" in embodiments in which the reduced temperature streams flow through additional conduits following discharge from the vortex tube nozzles and prior to impingement upon the targeted regions of the powertrain 30.

The targeted regions of the work vehicle powertrain 30 are schematically represented by cross-hatched areas 86, 88, 90 in FIG. 2, while the impingement streams are represented by the dashed lines extending from the nozzles of the vortex tubes 66, 68, 70 to the targeted regions 86, 88, 90. The targeted regions 86, 88, 90 may correspond to specific structural features or areas of the engine 40, LPT section 42, and HPT section 44, which have been identified as susceptible to airborne FOD accumulation and/or which tend to reach highly elevated local temperatures during operation of the powertrain 30. Examples of such structural features or areas are discussed below in connection with FIGS. 4-7. First, however, further discussion of example vortex tube suitable for usage as any or all of the vortex tubes 64, 66, 68, 70 is provided in conjunction with FIG. 3.

Figure 3:
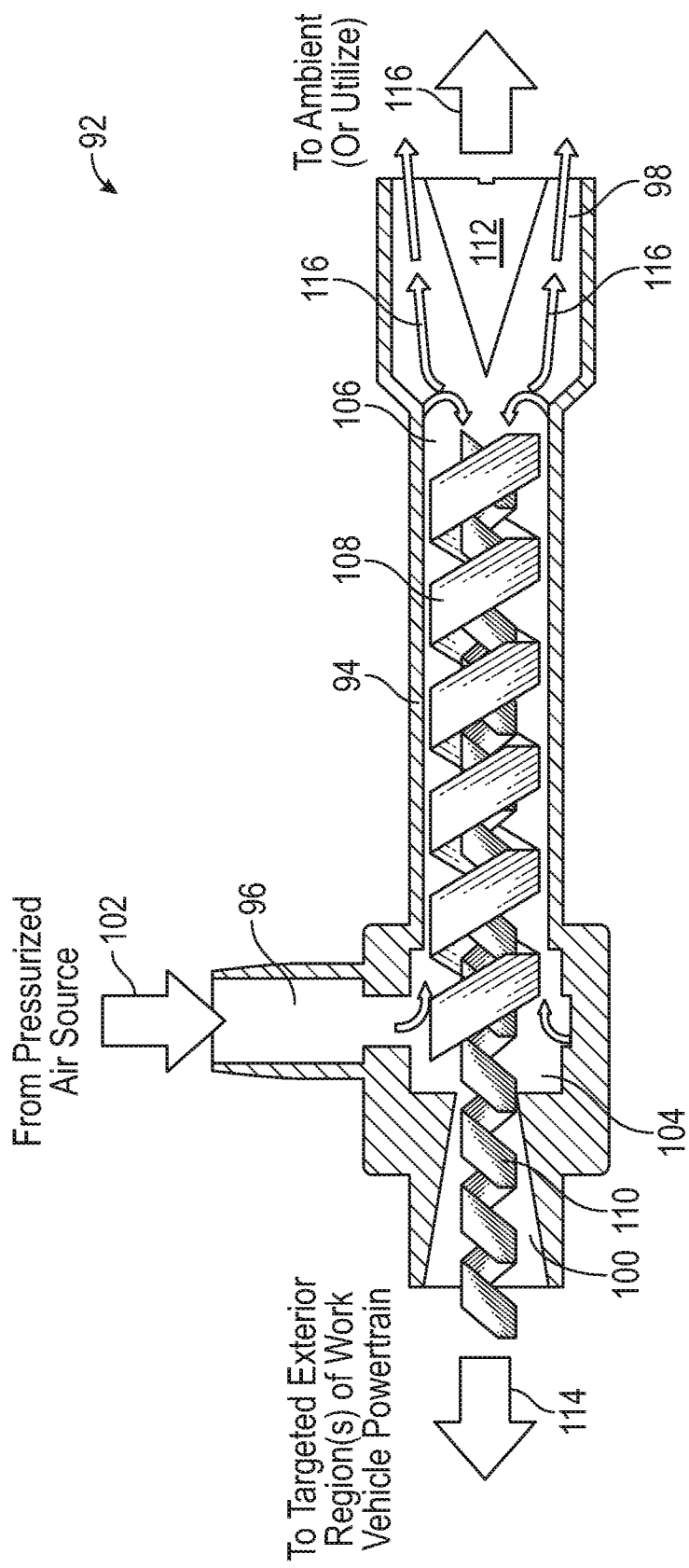
FIG. 3 is a cross-section of a vortex tube suitably included in the example cooling and debris mitigation system shown in FIG. 2.

Referring now to FIG. 3, an example vortex tube 92 is shown in cross-section. As the example vortex tube 92 is suitable for usage as any or all of the vortex tubes 64, 66, 68, 70 of the cooling and debris mitigation system 22, the following description is equally applicable to each of the vortex tubes 64, 66, 68, 70 schematically shown in FIG. 2. This notwithstanding, the vortex tubes 64, 66, 68, 70 need not match the vortex tube 92 shown in FIG. 3 in all instances and may assume various other forms, providing that the vortex tubes 64, 66, 68, 70 (when present within the system 22) are each capable of separating a pressurized input stream into a hot exhaust stream and a reduced temperature stream, as described herein.

The example vortex tube 92 includes a flow body 94 having a vortex tube inlet 96, a first outlet or exhaust port 98, and a second outlet or nozzle 100. As indicated by the arrow 102, the vortex tube inlet 96 is fluidly coupled to the pressurized air source 32, 56 and receives pressurized airflow therefrom when the control valve 58 is opened. The flow body 94 is imparted with an internal geometry 104, 106, which separates the pressurized input stream into a hot body of air (represented by graphic 108) and a reduced temperature body of air (represented by graphic 110) within the flow body 94. Specifically, pressurized airflow received through the vortex tube inlet 96 tangentially enters a vortex spin chamber 104 and is directed to the right (in the illustrated orientation) due to the geometry (e.g., difference in sizing of the flow orifices) in this region. The pressurized air then flows along an elongated flow passage 106 within the vortex tube flow body 94 before encountering a conical end piece 112, which is engaged into the right terminal end of the vortex tube 92. The axial positioning of the end piece 112 relative to the flow body 94 determines the flow area through the annular orifice of the vortex tube exhaust port 98. As this position may be adjustable (e.g. via a threaded interface between the end piece 112 and the right end of the vortex tube 92) this feature is sometimes itself referred to as a "control valve"; however, the end piece 112 will not typically move after manual positioning or during operation of the vortex tube 92.

Due to the presence of the conical end piece 112, the cooler airflow is turned back from end piece 112, flows along a center or core portion of the flow passage 106, flows through the vortex spin chamber 104, and is ultimately able to pass through the constricted portion of the nozzle 100. This cooler fraction of the airflow then exits the vortex tube 92 as the reduced temperature stream, which is discharged through the nozzle 100 as indicated by an arrow 114. Conversely, the less dense, hotter airflow flows around the outer periphery of the end piece 112 and exits the flow body 94 through the exhaust port 98 as a hot exhaust stream (represented by arrows 116). In this manner, the separation of the pressurized input stream 102 into the hot stream 116 and the reduced temperature airstream 114 is achieved by the internal flow geometry 104, 106 of the vortex tube 92, the provision of conical end piece 112, and the vortex flow action induced within the flow body 94 of the vortex tube 92. Further, the generation of the reduced temperature output stream 114 is achieved without reliance on moving parts or heat transfer to a circulated coolant. The usage of the vortex tube 92 as any or all of the vortex tubes 64, 66, 68, 70 (FIG. 2) thus enables the desired temperature reduction of the output streams in a highly reliable, passive, and continuous manner. This reduces the overall complexity of the cooling and debris mitigation system 22, while further helping ensure failure free operation of the system 22 over extended periods of time.

The cooling effect achieved by the example vortex tube 92 (or any of vortex tubes 64, 66, 68, 70 shown in FIG. 2) may be quantified by comparing the difference in a first temperature of the airflow input stream 102 (alternatively, the temperature of the airflow provided by the pressurized air source 32, 56) to a second, lower temperature of the reduced temperature airstream 114 discharged through the nozzle 100 of the vortex tube 92, as described above. The differential between the first and second temperatures will vary between embodiments and during the course of operation based on any number of factors including, for example, the pressure level and temperature of the input stream, the design of the vortex tube 92, and the external heat loads to which the vortex tube 92 is exposed. It has been demonstrated, however, that vortex tubes similar or identical to the illustrate vortex tube 92 can achieve significant cooling of the reduced temperature output stream. In this regard, the differential between the first temperature (the temperature of the input stream 102) and the second temperature (the temperature of the reduced temperature output stream 114) may approach, if not exceed 70 degrees Celsius in at least some instances. The pressure of the input airstream applied to the vortex tube by the pressurized air source 32, 56 may range from about 550 kilopascal (kpa) to about 700 kpa in embodiments. In other instances, the pressure of the input airstream may be greater than or less than the aforementioned range.

Figure 4:
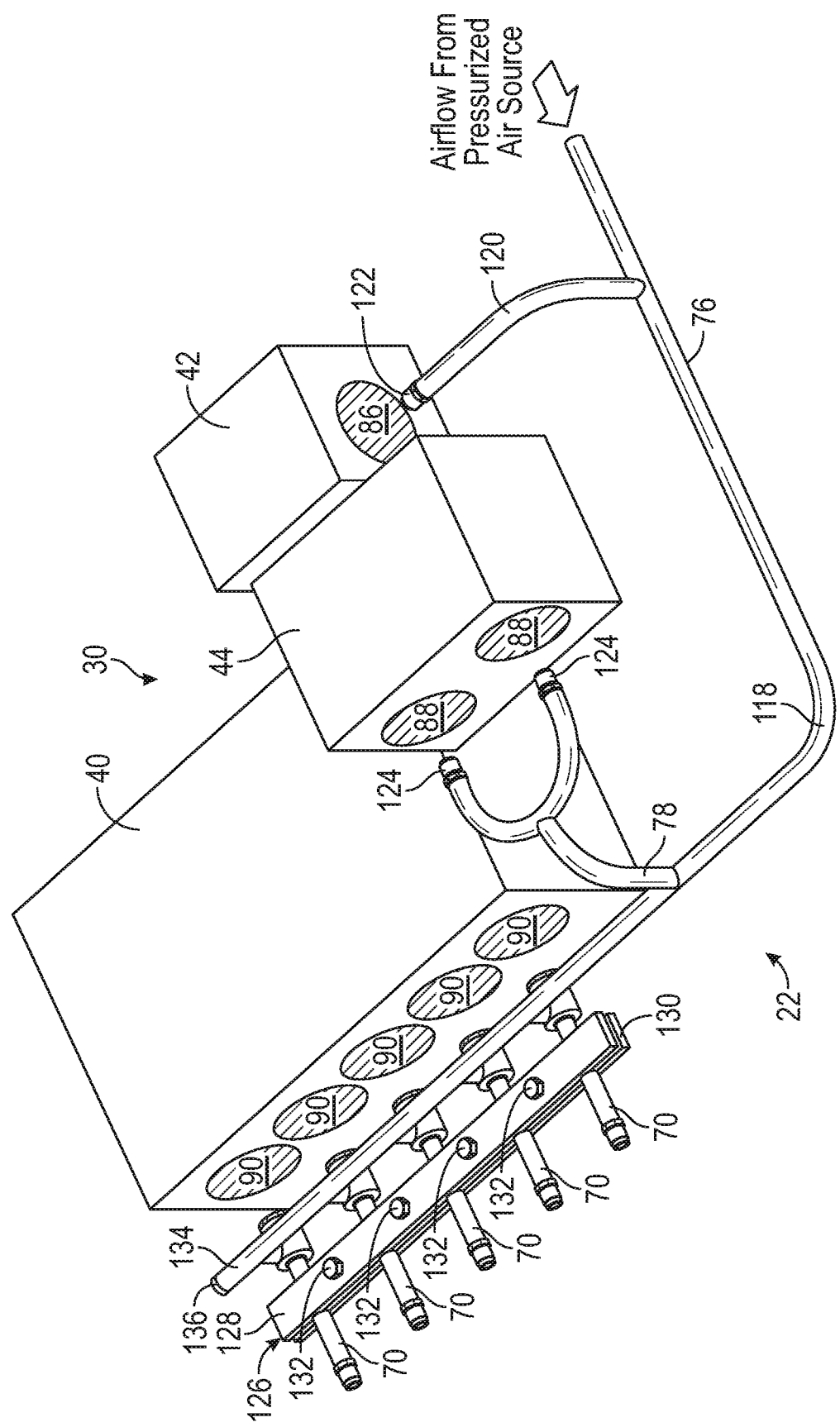
FIG. 4 is an isometric view of a portion of the example cooling and debris mitigation system shown in FIG. 2 illustrating one manner in which the impingement outlets of the cooling and debris mitigation system may be distributed about the engine and other components contained in a work vehicle powertrain (generically depicted) to direct reduced temperature airstreams against targeted exterior regions thereof.

Progressing next to FIG. 4, one manner in which the vortex tubes 64, 66, 68, 70 and a portion of flow network 72, 74, 76, 78 may be arranged adjacent or in close proximity of the engine 40, LPT section 42, and HPT section 44 is illustrated. Here, the engine 40, LPT section 42, and HPT section 44 are generically illustrated as blocks for illustrative clarity, with more realistic depictions of the engine 40, LPT section 42, and HPT section 44 appearing in FIGS. 5-7 as discussed below. The example of FIG. 4 generally corresponds with the example of FIG. 3, with the exception that the vortex tubes 66, 68 are replaced by the non-vortex tube nozzles or nozzle inserts 122, 124 in FIG. 4, as further described below. In still other embodiments, any or the vortex tubes 66, 68, 70 located at the terminal ends of the flow network 72, 74, 76, 78 can be omitted in favor of simple conduit openings, nozzle pieces, or the like, providing that the system 22 includes at least one vortex tube for generating a reduced temperature airstream, at least a portion of which is ultimately directed against one or more targeted regions of a work vehicle powertrain.

As shown in FIG. 4, the manifold flow line 76 may include a bend or elbow 118 to extend at least partially around an outer periphery of the powertrain 30 and supply airflow to the impingement outlets positioned about the powertrain 30. The flow network 72, 74, 76, 78 also includes an additional flow line 120, which fluidly couples the manifold flow line 76 to the impingement outlet through which an impingement stream is discharged against the targeted region 86 of the LPT section 42. This impingement outlet may be provided as the open terminal end of the flow line 120, such as the open end of a tube or other conduit, in embodiments. Alternatively, as illustrated in FIG. 4, the flow line 120 may terminate in a nozzle piece or nozzle insert 122, which serves as an impingement outlet. The provision of such a nozzle insert 122 may enable the impingement stream striking the targeted region 86 of the LPT section 42 to be imparted with an increased velocity, improved accuracy, and/or to be better shaped to provide complete coverage of the targeted region 86. Additionally, the nozzle insert 122 may be selected to have a predetermined flow resistance (e.g., through sizing of the restrictive flow orifice(s) within the insert 122) to control the flow rate through the insert 122 as compared to the other impingement outlets; e.g., in embodiments, the nozzle insert 122 and the other impingement outlets may be imparted with differing flow resistances to achieve a substantially uniform flow rate across all impingement outlets during operation of the system 22, as further discussed below. Flow restrictions, such as metering orifices, may also be placed in the flow network 72, 74, 76, 78, where appropriate, to help control the flow rate through the impingement outlets of the system 22.

The flow network 72, 74, 76, 78 further includes a bifurcated flow line 78. The bifurcated flow line 78 branches from the manifold flow line 76 to direct airflow through the two impingement outlets corresponding to the targeted regions 88 of the HPT section 44. Again, the open terminal ends of the bifurcated flow line 78 may serve as the impingement outlets; or, instead, the terminal ends of the flow line 78 may terminate in nozzle inserts 124 serving as the impingement outlets. In still further embodiments, the nozzle inserts 124 may be replaced by vortex tubes (e.g., the vortex tubes 68 shown in FIG. 2) and/or the nozzle insert 122 may be replaced by a vortex tube (e.g., the vortex tube 66 further shown in FIG. 2). Although omitting vortex tubes in favor of the (non-vortex tube) nozzle inserts 122, 124 in the example of FIG. 4, fractions of a reduced temperature stream are still discharged through the nozzle inserts 122, 124 due to the provision of at least one vortex tube upstream of the nozzle inserts 122, 124. In this regard, and referring briefly once again to FIG. 2, one or more vortex tubes may be positioned upstream of the nozzle inserts 122, 124 (e.g., the vortex tube 64 shown in FIG. 2) to supply the flow lines 76, 78, 120 with fractions of the reduced temperature stream discharged by the vortex tube(s). The reduced temperature stream is then divided between the flow lines 78, 120 (and possibly the below-described array of vortex tubes 70) as impingement streams directed against the targeted regions 86, 88 of the work vehicle powertrain 30.

In the illustrated example, an array of the vortex tubes 70 (hereafter also referred to as the "vortex tube array 70") is positioned alongside the primary engine 40 of the work vehicle powertrain 30. The vortex tubes 70 are disposed in a side-by-by side relationship and, thus, distributed in a linear array. In further embodiments, the vortex tubes 70 may be arranged in a different grouping or array having another spatial configuration, as determined based upon the regions of the engine 40 targeted for cooling and/or the packaging constraints of the engine compartment 46. Any suitable hardware features or structural interface may be provided to maintain the vortex tubes 70 in their desired positions. For example, as indicated in FIG. 3, a specialized clamping device 126 may be utilized for this purpose. The clamping device 126 includes a top plate 128, a bottom plate 130, and a plurality of fasteners 132 (e.g., bolts), with the top plate 128 and/or the bottom plate 130 having grooves or other features conforming to the outer geometries of the vortex tubes 70 around which the clamping device 126 is secured. The fasteners 132 are tightened to capture portions of the vortex tubes 70 between the plates 128, 130, and thereby secure the vortex tubes 70 in their desired positions. The clamping device 126 may further be affixed to other non-illustrated infrastructure included in the engine compartment 47 of the combine harvester 20 (FIG. 2).

Similar hardware devices (not shown) may also be utilized to secure the flow lines 78, 120, and nozzle inserts 122, 124 in their desired positions and orientations for directing airstreams against the targeted regions 86, 88, if needed. However, in embodiments in which the flow lines 78, 120 terminate in non-vortex tube nozzle inserts 122, 124, the flow lines 78, 120 may possess sufficient structural rigidity to extend for some distance in a cantilevered manner without direct physical support. In such embodiments, the flow lines 78, 120 (and the other flow lines described herein) may also be posable in embodiments such that the flow lines 78, 120 can be manually manipulated (and retain their manipulated positioning) to better aim the nozzle inserts 122, 124 at the targeted regions 86, 88.

The manifold flow line 76 thus includes a plurality of outlets to which the inlet ports of the vortex tubes 70 are fluidly connected. Additionally, the terminal end of manifold flow line 76 adjacent the vortex tube array 70 is enclosed by a stopper piece or endcap 136. If desired, the endcap 136 can be removed to allow the installation of additional tubing and impingement outlets, whether provided in the form of simple openings, vortex tubes similar to vortex tubes 70, nozzle inserts similar to nozzle inserts 122, 124, or a combination thereof. This enables the expansion of the cooling and debris mitigation system 22 to better tailor the system 22 to suit the needs of different powertrains. In a similar regard, other interfaces or junctures for adding or removing flow lines may be provided in the flow network 72, 74, 76, 78 to allow design flexibility and expansion. In this manner, additional conduit lines and impingement outlets can be readily added or removed to best suit a particular application or to enable end user customization of the system 22.

As indicated briefly above, the flow areas through the impingement outlets may be tailored to achieve a desired flow rate through the impingement outlets, particularly when fluidly coupled in parallel and concurrently supplied with pressurized airflow. For example, if additional cooling or debris clearance is desired in a particular subset of targeted regions 86, 88, 90, the impingement outlet or outlets corresponding to this subset of targeted regions 86, 88, 90 may be imparted with a lower flow resistance (flow coefficient) to provide a higher rate of airflow therethrough as compared to the other impingement outlets of the cooling and debris mitigation system 22. Further, in certain embodiments, it may be desired to provide a substantially uniform flow rate across all or a subset of the impingement outlets, which may then be sized accordingly. Considering the vortex tube array 70 shown in FIG. 4-6 as an example, the vortex tubes 70 further downstream of the pressurized air source 32, 65 may be imparted with lower flow resistances (lower pressure drop thereacross) as compared to the vortex tube(s) upstream of this vortex tube to provide a substantially uniform flow rate across the vortex tubes within the array 70. Stated differently, the plurality of vortex tubes 70 may be selected to have different flow resistances or flow coefficients in a manner increasing uniformity in flow rate across the vortex tubes 70 during operation of the cooling and debris mitigation system 22. Similarly, the nozzle inserts 122, 124 may be sized to achieve a desired flow rate or restriction at these locations, while ensuring sufficient pressure supply to the vortex tubes 70. Also, as noted above, metering orifices or other controlled flow restrictions may also be introduced into the flow network 72, 74, 76, 78 between selected impingement outlets for this purpose.

Figure 5:
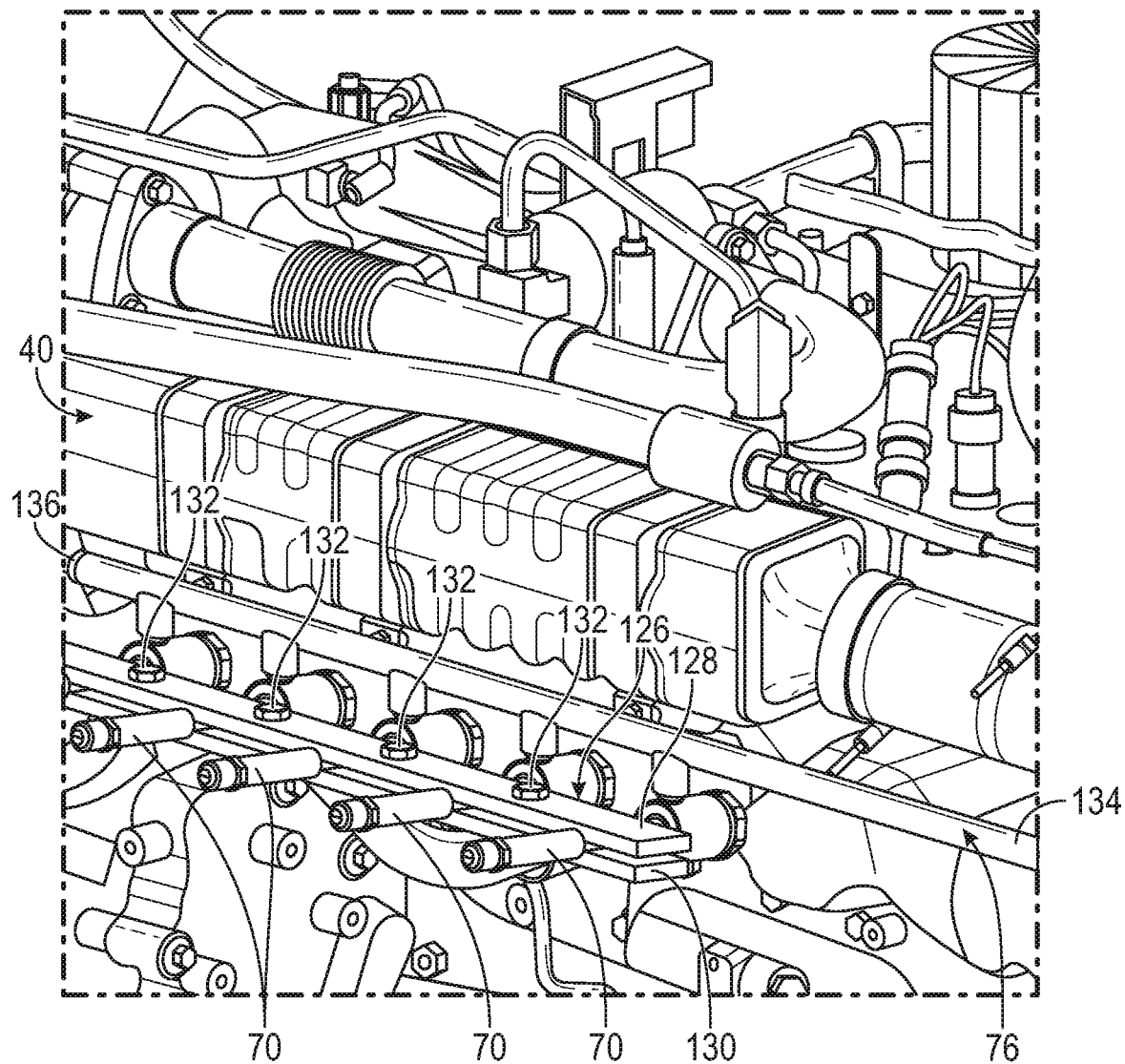
FIGS. 5 and 6 are isometric and mixed views, respectively, illustrating a more realistic manner in which a vortex tube array included in the example cooling and debris mitigation system may be positioned to direct reduced temperature airstreams against targeted regions of an engine block.
Figure 6:
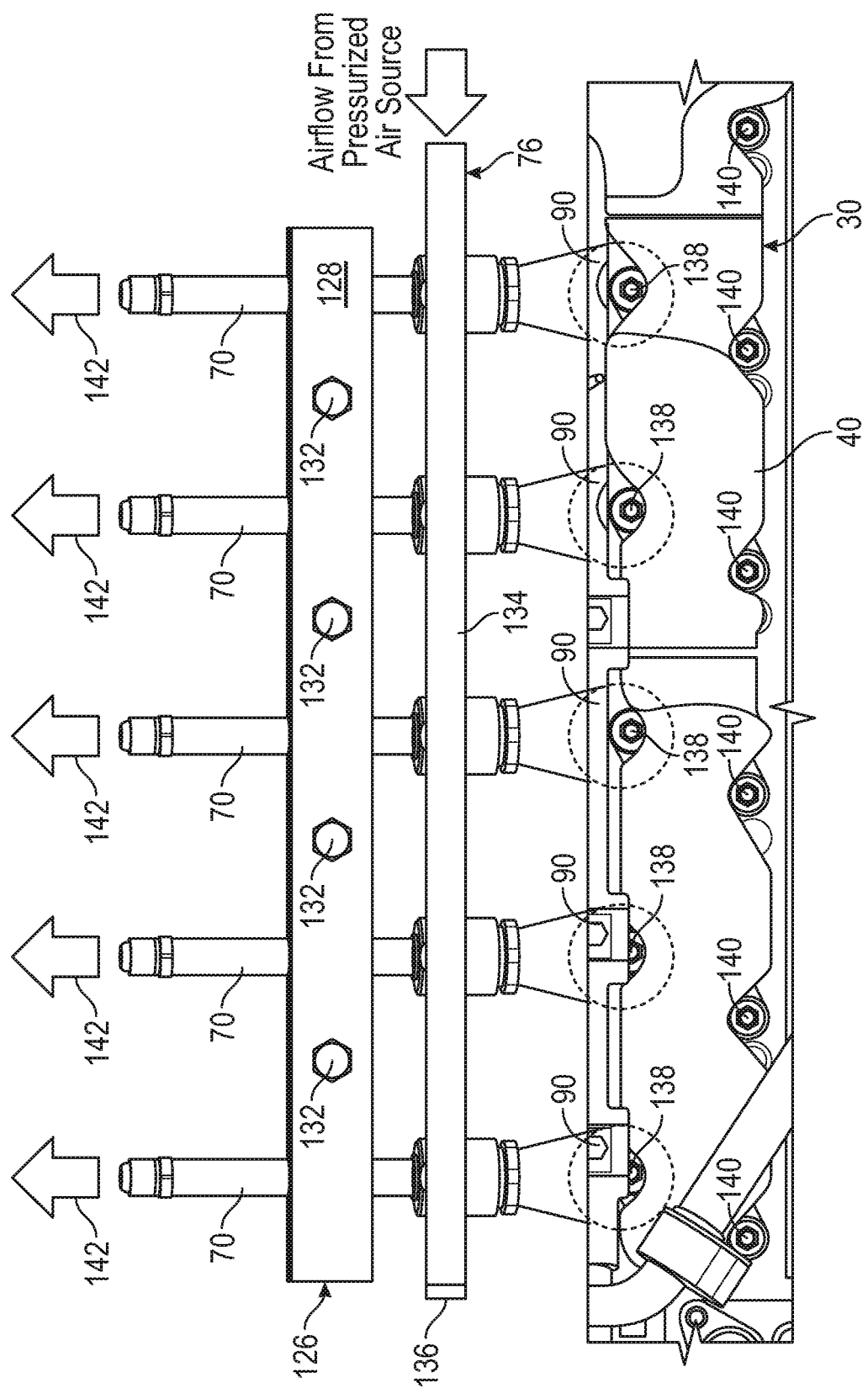

The particular regions of the primary engine 40 targeted for local cooling and debris clearance will vary among embodiments of the system 22. By way of example, and referring now to FIGS. 5 and 6, the vortex tubes 70 may be positioned to direct impingement streams against selected manifold top mounting bolts 138 of the primary engine 40, which may further include other manifold top mounting bolts 140. Such mounting bolts 138, and the regions surrounding the bolts 138, may reach highly elevated temperatures during operation of the engine 40. Further, due to geometry (e.g., crevices and close-fitting or mating surfaces) between the bolts 138 and the engine manifold, these regions may be prone to the accumulation of FOD. Thus, as indicated in FIGS. 5 and 6, the vortex tubes 70 may be positioned to point or direct the vortex tube nozzles at the targeted regions 90 of the primary engine 40 containing some or all of the manifold top mounting bolts 138. Concurrently, the vortex tubes 70 may be positioned to point the exhaust ports (through which the hot streams are discharged) in a direction away from the targeted regions 90. In other instances, the exhaust ports of the vortex tubes 70 may connect to additional conduits (piping or tubing), which conducts the heated exhaust streams to the exterior of the engine compartment 46. Finally, in the example of FIGS. 5 and 6, the inlets ports of the vortex tubes 70 are oriented in a generally upward direction and are fluidly coupled in parallel by a terminal segment 134 of the manifold flow line 76. Other orientations and positionings are possible in further embodiments, providing that the vortex tubes 70 are positioned to direct the reduced temperatures streams against the targeted regions 90 of the primary engine 40.

Figure 7:
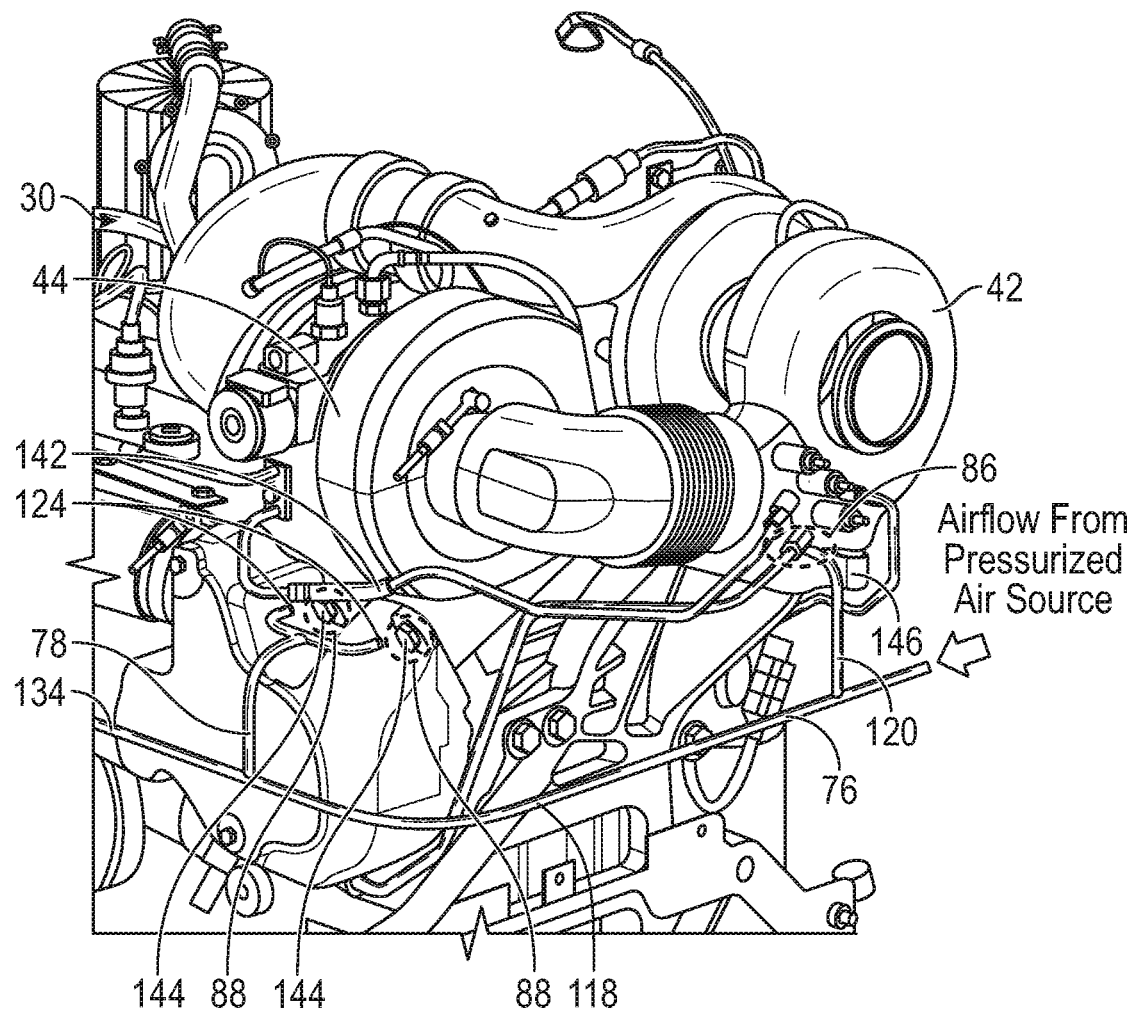
FIG. 7 is an isometric view illustrating a more realistic manner in which other outlets included in the example cooling and debris mitigation system may be positioned around components of the work vehicle powertrain (here, high and low pressure turbine sections) in an embodiment of the present disclosure.

Turning next to FIG. 7, certain features or areas of the LPT section 42 and HPT section 44 are identified, which may be usefully targeted by the system 22 for debris clearance and impingement cooling. As indicated by dashed regions 88, the impingement outlets corresponding to nozzle inserts 124 may discharge cooled airstreams against the inter-stage elbow clamp 142 and/or the manifold connection containing bolts 144 of the HPT section 44. Comparatively, the impingement outlets corresponding to the nozzle insert 122 (hidden from view in FIG. 7) may discharge a cooled impingement stream against the mounting foot 146 of the LPT section 42. Again, such regions have been identified as prone to FOD collection due, at least in part, to the complex external geometries and/or mating interfaces in these regions in which FOD may become trapped or embedded. Such regions may also reach highly elevated temperatures during powertrain operation potentially exceeding the flash point of the FOD ingested into the engine compartment 46 (FIG. 2), absent the impingement cooling provided by the cooling and debris mitigation system 22. The provision of the cooling and debris mitigation system 22, which delivers targeted impingement cooling and debris clearance to these keys areas, thus significantly improves the resistance of the powertrain 30 to FOD-induced engine fires.

Figure 8:
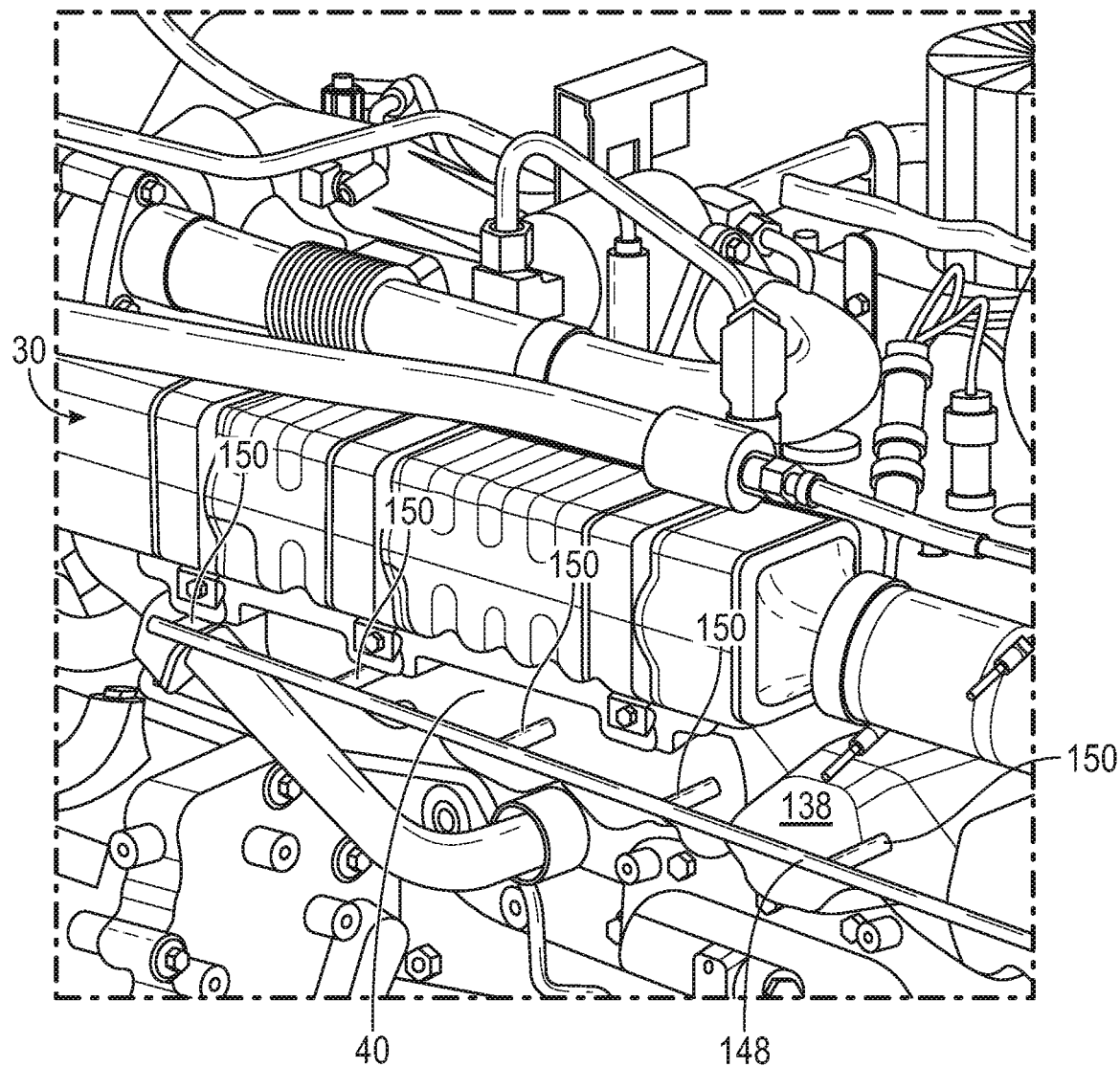
FIG. 8 is an isometric view similar to that shown in FIG. 5, but illustrating one manner in which non-vortex tube impingement outlets may be positioned to direct reduced temperature airstreams against targeted regions of an engine block in accordance with a further example embodiment of the present disclosure.

As noted above, alternative embodiments of the cooling and debris mitigation system 22 may include any practical number of vortex tubes, which may be positioned in various different locations within the flow network 72, 74, 76, 78. In certain embodiments, cooling and debris mitigation system 22 may include only a single vortex tube (or a small number of vortex tubes) upstream of the impingement outlets positioned about the powertrain 30. In such embodiments, the array of vortex tubes 70 shown in FIGS. 2 and 4-6 may be replaced by conduits terminating in open ends, which then serve as the impingement outlets. Further emphasizing this point, FIG. 8 illustrates an alternative embodiment of the cooling and debris mitigation system 22 (partially shown) in which the vortex tubes 70 are replaced by a manifold flow line 148 from which a number of relatively short tube members or segments 150 extend in a side-by-side relationship. The tube segments 150 may terminate in opening ends, which discharge impingement streams against the targeted areas of the powertrain 30; e.g., against the regions of the engine 40 containing a row of top mounting bolts (hidden from) analogous to those shown in FIG. 6. Again, one or more vortex tubes are provided upstream of the manifold flow line 148 (e.g., the vortex tube 64 shown in FIG. 2) to provide the desired stream separation functionality and supply the manifold flow line 148, and therefore the impingement outlets, with fractions of the reduced temperature stream for impingement cooling and debris clearance purposes. In further embodiments, nozzle pieces or inserts similar to the above-described nozzle inserts 122, 124 may be joined to the open ends of the tube segments 150; or the terminal ends of the tube segments 150 may be shaped (e.g., pinched) to provide, for example, convergent nozzle flow geometries.

Enumerated Examples of the Cooling and Debris Mitigation System

The following examples of the cooling debris and mitigation system are further provided and numbered for ease of reference.

1. A cooling and debris mitigation system for a work vehicle powertrain includes a pressurized air source providing pressurized airflow at a first temperature, a plurality of impingement outlets positioned proximate the work vehicle powertrain to direct airstreams against targeted exterior regions thereof, a flow network fluidly coupling the pressurized air source to the plurality of impingement outlets, and a first vortex tube positioned in the flow network. The first vortex tube is configured to separate pressurized airflow received from the pressurized air source into a hot stream and a reduced temperature stream. The first vortex tube includes a vortex tube inlet fluidly coupled to the pressurized air source, an exhaust port through which the hot stream is discharged, and a nozzle through which the reduced temperature stream is discharged at a second temperature less than the first temperature. The reduced temperature stream impinges upon at least one of the targeted exterior regions of the work vehicle powertrain to provide cooling thereto and reduce debris accumulation thereon.

2. The cooling and debris mitigation system of example 1, wherein the pressurized air source includes an air compressor tank fluidly coupled to the vortex tube inlet by the flow network, as well as an air compressor fluidly coupled to the air compressor tank and configured to supply pressurized airflow thereto.

3. The cooling and debris mitigation system of example 2, wherein the air compressor includes a manual accessory coupling for manual attachment of at least one pressurized cleaning accessory. The manual accessory coupling is accessible from an exterior of a work vehicle including the work vehicle powertrain.

4. The cooling and debris mitigation system of example 2, wherein the pressurized air source further includes a pressure relief valve configured to vent pressurized airflow from the air compressor tank to the vortex tube inlet when a maximum fill pressure of the air compressor tank is surpassed.

5. The cooling and debris mitigation system of example 2, further including: a control valve positioned in the flow network downstream of the air compressor tank and the upstream of the vortex tube inlet; and a controller operably coupled to the control valve and modulating the control valve to regulate pressurized airflow from the air compressor tank to the vortex tube inlet during operation of the work vehicle powertrain.

6. The cooling and debris mitigation system of example 5, wherein the controller is configured to modulate the control valve in a manner generating pressurized air pulses supplied to the vortex tube inlet.

7. The cooling and debris mitigation system of example 5, wherein the controller is operable in at least a debris clearance mode and an enhanced cooling mode. When operating in the debris clearance mode, the controller commands the control valve to generate pressurized air pulses with a greater frequency than when operating in the enhanced cooling mode.

8. The cooling and debris mitigation system of example 1, wherein the flow network includes a manifold flow line having manifold outlets included in the plurality of impingement outlets; and wherein the nozzle of the first vortex tube is fluidly coupled to an inlet of the manifold flow line 9. The cooling and debris mitigation system of example 8, wherein the work vehicle powertrain further includes a turbocharger; and wherein the plurality of impingement outlets further includes at least one turbocharger impingement outlet fluidly coupled to the nozzle of the first vortex tube and positioned to direct a fraction of the reduced temperature stream against a targeted exterior region of the turbocharger.

10. The cooling and debris mitigation system of example 8, wherein the work vehicle powertrain includes manifold top mounting bolts; and wherein the manifold outlets are positioned to direct fractions of the reduced temperature stream against targeted exterior regions of the work vehicle powertrain corresponding to the manifold top mounting bolts.

11. The cooling and debris mitigation system of example 8, wherein the manifold flow line wraps at least partially around an outer periphery of the work vehicle powertrain.

12. The cooling and debris mitigation system of example 1, further including a plurality of vortex tubes in which the first vortex tube is included, the plurality of vortex tubes fluidly coupled in parallel by the flow network.

13. The cooling and debris mitigation system of example 12, wherein the plurality of vortex tubes is arranged in a substantially linear array spaced alongside the work vehicle powertrain.

14. The cooling and debris mitigation system of example 12, wherein the plurality of vortex tubes is selected to provide different flow resistances increasing uniformity in flow rate across the plurality of vortex tubes during operation of the cooling and debris mitigation system.

15. In further embodiments, a cooling and debris mitigation system utilized with a work vehicle powertrain includes a pressurized air source, a flow network, and a vortex tube, which is configured to separate pressurized airflow received from the pressurized air source into a hot stream and a reduced temperature stream. The vortex tube has a vortex tube inlet fluidly coupled to the pressurized air source, an exhaust port through which the hot stream is discharged, and a nozzle through which the reduced temperature stream is discharged. The flow network includes, in turn, a supply flow line fluidly coupling an outlet of the pressurized air source to the vortex tube inlet, a plurality of impingement outlets positioned about the work vehicle powertrain to direct airstreams against targeted exterior regions thereof, and a manifold flow line fluidly coupling the nozzle of the vortex tube to the plurality of impingement outlets.

CONCLUSION

There has thus been provided embodiments of a cooling and debris mitigation system for usage in conjunction with powertrains of work vehicles, such as combine harvesters and other work vehicles operated in debris-laden ambient environments. The cooling and debris mitigation system reduces the likelihood of FOD-induced engine fires by providing cooling and debris clearance to targeted regions of a work vehicle powertrain. Embodiments of the cooling and debris mitigation system may incorporate one or more vortex tubes to separate highly pressurized supply streams into heated exhaust streams and reduced temperature streams. Advantageously, the vortex tubes may provide continuous, reliable, passive operation, while achieving the desired cooling of the impingement streams through a controlled tradeoff in pressure reduction. In at least some instances, the cooling and debris mitigation system leverages the availability of excess air pressure for conversion into reduced temperature airstreams, which are well-suited for impingement cooling of powertrain hot spots and which retaining sufficient pressure for debris clearance purposes. In certain embodiments, the cooling and debris mitigation system may further utilize excess airflow provided by an air compressor to serve as the pressurized air source feeding the vortex tubes. Embodiments of the cooling and debris mitigation system further feature expandable, adaptable designs amenable to low cost integration into work vehicle powertrains with minor, if any modifications to existing components and infrastructure.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A cooling and debris mitigation system for a work vehicle powertrain, the cooling and debris mitigation system comprising:
   a pressurized air source providing pressurized airflow at a first temperature;
   a plurality of impingement outlets positioned proximate the work vehicle powertrain to direct airstreams against targeted exterior regions thereof;
   a flow network fluidly coupling the pressurized air source to the plurality of impingement outlets; and
   a first vortex tube positioned in the flow network and configured to separate pressurized airflow received from the pressurized air source into a hot stream and a reduced temperature stream, the first vortex tube comprising:
   a vortex tube inlet fluidly coupled to the pressurized air source;
   an exhaust port through which the hot stream is discharged; and
   a nozzle through which the reduced temperature stream is discharged at a second temperature less than the first temperature, the reduced temperature stream impinging upon at least one of the targeted exterior regions of the work vehicle powertrain to provide cooling thereto and reduce debris accumulation thereon.

2. The cooling and debris mitigation system of claim 1, wherein the pressurized air source comprises:
   an air compressor tank fluidly coupled to the vortex tube inlet by the flow network; and
   an air compressor fluidly coupled to the air compressor tank and configured to supply pressurized airflow thereto.

3. The cooling and debris mitigation system of claim 2, wherein the air compressor comprises a manual accessory coupling for manual attachment of at least one pressurized cleaning accessory, the manual accessory coupling accessible from an exterior of a work vehicle including the work vehicle powertrain.

4. The cooling and debris mitigation system of claim 2, wherein the air compressor tank has a maximum fill pressure; and
  wherein the pressurized air source further comprises a pressure relief valve configured to vent pressurized airflow from the air compressor tank to the vortex tube inlet when the maximum fill pressure of the air compressor tank is surpassed.

5. The cooling and debris mitigation system of claim 2, further comprising:
  a control valve positioned in the flow network downstream of the air compressor tank and the upstream of the vortex tube inlet; and
  a controller operably coupled to the control valve and modulating the control valve to regulate pressurized airflow from the air compressor tank to the vortex tube inlet during operation of the cooling and debris mitigation system.

6. The cooling and debris mitigation system of claim 5, wherein the controller is configured to modulate the control valve in a manner generating pressurized air pulses supplied to the vortex tube inlet.

7. The cooling and debris mitigation system of claim 5, wherein the controller is operable in at least a debris clearance mode and an enhanced cooling mode; and
  wherein, when operating in the debris clearance mode, the controller commands the control valve to generate pressurized air pulses with a greater frequency than when operating in the enhanced cooling mode.

8. The cooling and debris mitigation system of claim 1, wherein the flow network comprises a manifold flow line having a plurality of outlets; and
  wherein the nozzle of the first vortex tube is fluidly coupled to an inlet of the manifold flow line.

9. The cooling and debris mitigation system of claim 8, wherein the work vehicle powertrain further comprises a turbocharger; and
  wherein the plurality of impingement outlets further comprises at least one turbocharger impingement outlet fluidly coupled to the nozzle of the first vortex tube and positioned to direct a fraction of the reduced temperature stream against a targeted exterior region of the turbocharger.

10. The cooling and debris mitigation system of claim 8, wherein the work vehicle powertrain comprises manifold top mounting bolts; and
  wherein the manifold outlets are positioned to direct fractions of the reduced temperature stream against targeted exterior regions of the work vehicle powertrain corresponding to the manifold top mounting bolts.

11. The cooling and debris mitigation system of claim 8, wherein the manifold flow line wraps at least partially around an outer periphery of the work vehicle powertrain.

12. The cooling and debris mitigation system of claim 1, further comprising a plurality of vortex tubes in which the first vortex tube is included, the plurality of vortex tubes fluidly coupled in parallel by the flow network.

13. The cooling and debris mitigation system of claim 12, wherein the plurality of vortex tubes is arranged in a substantially linear array spaced alongside the work vehicle powertrain.

14. The cooling and debris mitigation system of claim 12, wherein the plurality of vortex tubes is selected to provide different flow resistances increasing uniformity in flow rate across the plurality of vortex tubes during operation of the cooling and debris mitigation system.

15. A cooling and debris mitigation system utilized with a work vehicle powertrain, the cooling and debris mitigation system comprising:
  a pressurized air source:
  a vortex tube configured to separate pressurized airflow received from the pressurized air source into a hot stream and a reduced temperature stream, the vortex tube comprising:
    a vortex tube inlet fluidly coupled to the pressurized air source;
    an exhaust port through which the hot stream is discharged; and
    a nozzle through which the reduced temperature stream is discharged; and
  a flow network, comprising:
    a supply flow line fluidly coupling an outlet of the pressurized air source to the vortex tube inlet;
    a plurality of impingement outlets positioned about the work vehicle powertrain to direct airstreams against targeted exterior regions thereof; and
    a manifold flow line fluidly coupling the nozzle of the vortex tube to the plurality of impingement outlets.

16. The cooling and debris mitigation system of claim 15, wherein the pressurized air source comprises:
  an air compressor having at least one manual accessory coupling accessible from the exterior of the work vehicle; and
  an air compressor tank fluidly coupled to the air compressor and configured to receive pressurized airflow therefrom, the air compressor tank having an outlet fluidly coupled to vortex tube inlet by the supply flow line.

17. A cooling and debris mitigation system utilized with a work vehicle powertrain, the cooling and debris mitigation system comprising:
  a pressurized air source providing pressurized airflow;
  a flow network fluidly coupling an outlet of the pressurized air source; and
  an array of vortex tubes positioned in the flow network and spaced alongside of the work vehicle powertrain, the array of vortex tubes comprising:
    vortex tube inlets fluidly coupled to the pressurized air source by the flow network;
    internal flow geometries configured to separate pressurized airflow received at the vortex tube inlets into hot stream and reduced temperature streams;
    exhaust ports through which the hot streams are discharged; and
    nozzles through which the reduced temperature streams are discharged for impingement against targeted exterior regions of the work vehicle powertrain.

18. The cooling and debris mitigation system of claim 17, wherein the pressurized air source comprises:
  an air compressor having at least one manual accessory coupling accessible from the exterior of the work vehicle; and
  an air compressor tank fluidly coupled to the air compressor and configured to receive pressurized airflow therefrom, the air compressor tank having an outlet fluidly coupled to vortex tube inlets through the flow network.

19. The cooling and debris mitigation system of claim 17, further comprising:

a control valve positioned in the flow network downstream of the air compressor tank and the upstream of the vortex tube inlet, the control valve including a valve element; and a controller operably coupled to the control valve and commanding movement of the valve element to regulate pressurized airflow from the air compressor tank to the vortex tube inlet during operation of the work vehicle powertrain.

20. The cooling and debris mitigation system of claim 17, wherein the flow network comprises a manifold flow line having manifold outlets included in the plurality of impingement outlets; and wherein the nozzle of the first vortex tube is fluidly coupled to an inlet of the manifold flow line.

* * * * *